United States Patent
Cheong et al.

(10) Patent No.: US 9,542,052 B2
(45) Date of Patent: Jan. 10, 2017

(54) METHOD FOR MANUFACTURING TOUCH SCREEN PANEL AND TOUCH SCREEN PANEL

(71) Applicant: ELECTRONICS AND TELECOMMUNICATIONS RESEARCH INSTITUTE, Daejeon (KR)

(72) Inventors: Woo Seok Cheong, Daejeon (KR); Jae Heon Shin, Daejeon (KR); Rae Man Park, Daejeon (KR); Kyung Hyun Kim, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 111 days.

(21) Appl. No.: 14/602,303

(22) Filed: Jan. 22, 2015

(65) Prior Publication Data

US 2015/0286314 A1    Oct. 8, 2015

(30) Foreign Application Priority Data

Apr. 2, 2014    (KR) .................. 10-2014-0039353

(51) Int. Cl.
*G06F 3/045*    (2006.01)
*G06F 3/044*    (2006.01)

(52) U.S. Cl.
CPC ..... *G06F 3/044* (2013.01); *G06F 2203/04103* (2013.01); *G06F 2203/04111* (2013.01); *G06F 2203/04112* (2013.01)

(58) Field of Classification Search
CPC ........ G06F 3/041; G06F 3/0416; G06F 3/044; G06F 2203/04103; G06F 2203/04111; G06F 2203/04112
See application file for complete search history.

(56) References Cited

U.S. PATENT DOCUMENTS

| | | | |
|---|---|---|---|
| 2007/0252825 A1* | 11/2007 | Nashiki | .............. G06F 3/045 345/173 |
| 2009/0146945 A1 | 6/2009 | Cho | |
| 2009/0244028 A1 | 10/2009 | Matsuo | |
| 2010/0156795 A1 | 6/2010 | Kim et al. | |
| 2010/0231542 A1 | 9/2010 | Momose | |

(Continued)

FOREIGN PATENT DOCUMENTS

| | | |
|---|---|---|
| JP | 2010-211647 A | 9/2010 |
| JP | 2010-211823 A | 9/2010 |

(Continued)

*Primary Examiner* — Joe H Cheng
(74) *Attorney, Agent, or Firm* — Rabin & Berdo, P.C.

(57) ABSTRACT

Provided herein is an electrostatic capacitive type window integrated touch screen panel and a method for manufacturing a touch screen panel thereof, the method comprising: forming an oxide metal oxide (OMO) hybrid electrode on a strengthened substrate; and etching the OMO hybrid electrode and forming a pattern, and forming a pattern insertion layer on the pattern, wherein the OMO hybrid electrode is formed by depositing a bottom-layer, metal-layer and top-layer on top of the strengthened substrate, and the pattern insertion layer is formed based on an oxide having a refractive index of a certain range.

18 Claims, 7 Drawing Sheets

(56) References Cited

U.S. PATENT DOCUMENTS

| | | | | |
|---|---|---|---|---|
| 2010/0233930 | A1* | 9/2010 | Ishida | G06F 3/0412 445/24 |
| 2011/0217548 | A1* | 9/2011 | Nashiki | B32B 7/02 428/339 |
| 2011/0298750 | A1* | 12/2011 | Wang | G06F 3/0412 345/174 |
| 2011/0318553 | A1* | 12/2011 | Lotz | C23C 14/34 428/212 |
| 2012/0094071 | A1* | 4/2012 | Itoh | G06F 3/044 428/141 |
| 2012/0098790 | A1 | 4/2012 | Han | |
| 2012/0200928 | A1* | 8/2012 | Kim | G06F 3/041 359/585 |
| 2013/0005139 | A1* | 1/2013 | Krasnov | G02F 1/13439 438/652 |
| 2013/0063393 | A1* | 3/2013 | Kurishima | B32B 7/02 345/174 |
| 2013/0266724 | A1 | 10/2013 | Cheong | |
| 2014/0145177 | A1* | 5/2014 | Lee | H01L 29/7869 257/43 |
| 2014/0232951 | A1* | 8/2014 | Ueda | C23C 14/08 349/12 |
| 2014/0327841 | A1* | 11/2014 | Shin | G06F 1/169 349/12 |
| 2015/0140810 | A1* | 5/2015 | Lee | H01L 21/76802 438/666 |
| 2015/0145816 | A1* | 5/2015 | Ueda | C23C 14/083 345/174 |

FOREIGN PATENT DOCUMENTS

| | | |
|---|---|---|
| JP | 2010-257492 A | 11/2010 |
| KR | 10-2008-0054318 A | 6/2008 |
| KR | 10-2009-0059726 A | 6/2009 |
| KR | 10-2010-0051292 A | 5/2010 |
| KR | 10-2010-0065486 A | 6/2010 |
| KR | 10-2010-0073546 A | 7/2010 |
| KR | 10-2010-0082514 A | 7/2010 |
| KR | 10-2010-0095886 A | 9/2010 |
| KR | 10-2010-0131076 A | 12/2010 |
| KR | 10-2011-0000722 A | 1/2011 |
| KR | 10-2011-0000985 A | 1/2011 |
| KR | 10-2012-0103023 A | 9/2012 |
| KR | 10-2013-0031042 A | 3/2013 |
| KR | 10-2013-0114820 A | 10/2013 |
| WO | WO 2008-072900 A1 | 6/2008 |

* cited by examiner

METHOD FOR MANUFACTURING TOUCH SCREEN PANEL AND TOUCH SCREEN PANEL

CROSS-REFERENCE TO RELATED APPLICATIONS

This application claims the benefit of priority under 35 U.S.C. §119(a) of Korean Patent Application No. 10-2014-0039353, filed on Apr. 2, 2014, in the Korean Intellectual Property Office, the entire disclosure of which is incorporated herein by reference for all purposes.

BACKGROUND

1. Field

The following description relates to a touch screen, more particularly, to a touch screen panel and a method for manufacturing the touch screen panel.

2. Description of Related Art

Touch screens may be classified into electrostatic capacitive type touch screens, resistive overlay type touch screens, infrared ray (IR) type touch screens, and surface acoustic wave (SAW) type touch screens.

In a resistive overlay (constant pressure) type touch screen, a touched position is recognized based on the electric signals generated as transparent electrodes of a upper substrate and lower substrate contacts each other when a finger or pen touches the substrates. Resistive overlay type touch screens are inexpensive, and are favorable for miniaturization since they are highly accurate. Thus, resistive overlay type touch screens may be mainly adopted for usage in personal digital assistants (PDAs), portable multimedia players (PMPs), navigations, and handsets and the like.

In an electrostatic capacitive type touch screen, when an electric conductor touches a transparent electrode on a substrate, for example by a finger touching the transparent electrode on the substrate, a constant electrostatic capacitive layer will be formed on an insulation layer, through which signals are transmitted. The touched position can then be recognized by calculating the size of the transmitted signals and detecting the position accordingly.

Although resistive overlay touch screens are favorable in terms of cost, and electrostatic capacitive type touch screens cost more that resistive overlay type touch screens, electrostatic capacitive type touch screens are more preferred by users due to their high light transmission index, multi-touch capability, and high reaction speed. Hence, electrostatic capacitive type touch screens are expected to become the mainstream in portable terminal touch panels in the years to come.

A surface acoustic wave (SAW) type touch screen recognizes a touched position by sensing the reduction in wave size as the surface acoustic wave discharged meets an obstacle. Surface acoustic wave type touch screens have high light transmission index, accuracy and definition, and thus they are mostly applied to unmanned information terminals installed in outdoor places. They are applicable to large sized panels, but are susceptible to contamination of sensors and liquid.

Infrared ray (IR) type touch screens use the characteristic of infrared ray which is not visible to humans but goes straight and thus gets blocked when it meets an obstacle. This type of touch screen may be made by just one sheet of glass without the need of depositing an indium tin oxide (ITO) film or glass plate on a front surface of a display, and thus it is a method providing the highest transmission index.

The electrostatic capacitive type TSP (touch screen panel) is the only type of touch screen which enables multi-touching that is the basis for emotional touching and where high transmission sensors can be provided therein. Large area slim touch sensor technique providing the emotional touch function applicable to large area displays is expected to be the center of touch sensor technique within the next 10 years.

SUMMARY

A first purpose of the present disclosure is to provide a method for manufacturing a touch screen panel.

A second purpose of the present disclosure is to provide a touch screen panel.

In one general aspect, there is provided a method for manufacturing an electrostatic capacitive type window integrated touch screen panel, the method comprising: forming an oxide metal oxide(OMO) hybrid electrode on a strengthened substrate; and etching the OMO hybrid electrode and forming a pattern, and forming a pattern insertion layer on the pattern, wherein the OMO hybrid electrode is formed by depositing a bottom-layer, metal-layer and top-layer on top of the strengthened substrate, and the pattern insertion layer is formed based on an oxide having a refractive index of a certain range. The method may further comprise forming an inter electrode insulation layer on top of the top-layer and the pattern insertion layer; and forming a bridge on top of the inter electrode insulation layer and connecting a metal wire to the OMO hybrid electrode. The inter electrode insulation layer may be made of inorganic and organic material, the inorganic and the organic material may be at least one of SiOx, SiNx, MgF$_2$, and SiOxNy(herein, x and y are natural numbers), the bridge and the metal wire may be realized at the same time, the bridge and the metal wire may be made of metal of a same thickness, and the metal may be a single layer and multi metal layer, the metal being at least one of Mo, Al, Cu, Cr, Ag, Ti/Cu, Ti/Ag, Cr/Ag, Cr/Cu, Al/Ag, Al/Cu, and Mo/Al/Mo. The refractive index of the pattern insertion layer may be at least 1.6 but not more than 2.0, the pattern insertion layer may have a thickness of at least 60 nm but not more than 120 nm, and the oxide of the pattern insertion layer may be one of MgO, Ta$_2$O$_3$ and SiON. The top-layer may have a refractive index of at least 1.8 but not more than 2.2, the top-layer may have a thickness of at least 30 nm but not more than 70 nm, and the top-layer may be made of one of indium tin oxide(ITO), indium-zinc oxide (IZO), Al-doped ZnO(AZO), Ga-doped ZnO(GZO), indium-tin-zinc oxide(ITZO), zinc-tin oxide(ZTO), indium-gallium oxide(IGO), SnO$_2$ and ZnO. The metal-layer may have a thickness of at least 5 nm but not more than 10 nm, the metal-layer may be made of Ag or Ag alloy, and the Ag alloy may be at least one of Ag—Al, Ag—Mo, Ag—Au, Ag—Pd, Ag—Ti, Ag—Cu, Ag—Au—Pd, and Ag—Au—Cu. The bottom-layer may have a refractive index of at least 2.0 but not more than 2.7, the bottom-layer may have a thickness of at least 20 nm but not more than 60 nm, and the bottom-layer may be at least one of TiO$_2$, Nb$_2$O$_5$, ZnO, ZrO$_2$, and HfO$_2$.

In another general aspect, there is provided an electrostatic capacitive type window integrated touch screen panel, the touch screen panel comprising: an oxide metal oxide (OMO) hybrid electrode deposited on top of a strengthened substrate; and a pattern insertion player formed on the basis of a pattern formed by etching the OMO hybrid electrode, wherein the OMO hybrid electrode is formed by depositing a bottom-layer, metal-layer, and top-layer on top of the strengthened substrate, and the pattern insertion layer is formed on the basis of an oxide having a refractive index of a certain range. The touch screen panel may further comprise an inter electrode insulation layer formed on top of the top-layer and the pattern insertion layer; a bridge formed on top of the inter electrode insulation layer; and a metal wire connected to the OMO hybrid electrode. The inter electrode insulation layer may be made of inorganic and organic material, the inorganic and the organic material may be at least one of SiOx, SiNx, $MgF_2$, and SiOxNy (herein, x and y are natural numbers), the bridge and the metal wire may be realized at the same time, the bridge and the metal wire may be made of metal of a same thickness, and the metal may be a single and multi metal layer, the metal being at least one of Mo, Al, Cu, Cr, Ag, Ti/Cu, Ti/Ag, Cr/Ag, Cr/Cu, Al/Ag, Al/Cu, and Mo/Al/Mo. The pattern insertion layer may have a refractive index of at least 1.6 but not more than 2.0, the pattern insertion layer may have a thickness of at least 60 nm but not more than 120 nm, and the oxide of the pattern insertion layer may be one of MgO, $Ta_2O_3$, and SiON. The top-layer may have a refractive index of at least 1.8 but not more than 2.2, the top-layer may have a thickness of at least 30 nm but not more than 70 nm, and the top-layer may be made of one of indium tin oxide (ITO), indium-zinc oxide (IZO), Al-doped ZnO (AZO), Ga-doped ZnO (GZO), indium0tin-zinc oxide (ITZO), zinc-tin oxide (ZTO), indium-gallium oxide (IGO), $SnO_2$ and ZnO. The metal-layer may have a thickness of at least 5 nm but not more than 10 nm, the metal-layer may be made of Ag or Ag alloy, and the Ag alloy may be at least one of Ag—Al, Ag—Mo, Ag—Au, Ag—Pd, Ag—Ti, Ag—Cu, Ag—Au—Pd, and Ag—Au—Cu. The bottom-layer may have a refractive index of at least 2.0 but not more than 2.7, the bottom-layer may have a thickness of at least 20 nm but not more than 60 nm, and the bottom-layer may be at least one of $TiO_2$, $Nb_2O_5$, ZnO, $ZrO_2$, and $HfO_2$.

Other features and aspects may be apparent from the following detailed description, the drawings, and the claims.

As aforementioned, in a touch screen panel and a method for manufacturing the touch screen panel according to exemplary embodiments of the present disclosure, there is provided a strengthened substrate integrated with a hybrid electrode (for example, OMO (oxide-metal-oxide)) thereby realizing low resistance and high transmission while ensuring pattern index-matching. A touch screen panel according to exemplary embodiments of the present disclosure uses hybrid electrodes to realize the TSP multi-touch function in an area that is at least 30 times larger than the area of a TSP (touch screen panel) of related art. For example, when the present disclosure is applied to a one layer TSP, the multi-touch function may be realized in an area up to 20 inches, and when the present disclosure is applied to a two layer TSP, the multi-touch function may be realized in an area up to 100 inches. Furthermore, in a touch screen panel according to exemplary embodiments of the present disclosure, the pattern index-matching which used to be a problem in hybrid electrodes may be resolved, whereby a high-resolution display may be realized.

Figure 1:
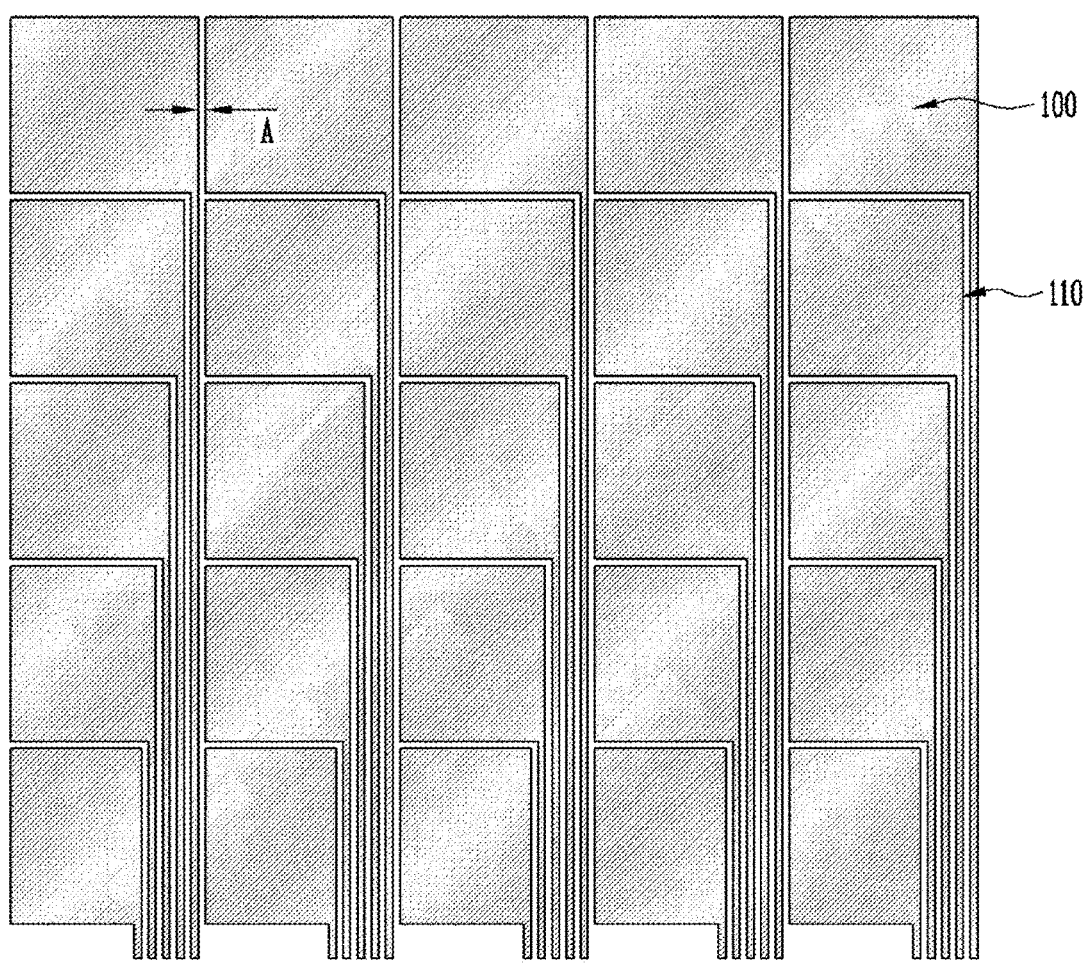
FIG. 1 is a conceptual diagram of a TSP of a matrix-switching pattern according to exemplary embodiments of the present disclosure.

Throughout the drawings and the detailed description, unless otherwise described, the same drawing reference numerals will be understood to refer to the same elements, features, and structures. The relative size and depiction of these elements may be exaggerated for clarity, illustrating, and convenience.

DETAILED DESCRIPTION

The following detailed description is provided to assist the reader in gaining a comprehensive understanding of the methods, apparatuses, and/or systems described herein. Accordingly, various changes, modifications, and equivalents of the systems, apparatuses and/or methods described herein will be suggested to those of ordinary skill in the art. Also, descriptions of well-known functions and constructions may be omitted for increased clarity and conciseness.

Terminologies such as "a first", "a second" and the like may be used for explaining various configurative elements, but the configurative elements should not be limited by these terminologies. These terminologies are only used for the sole purpose of differentiating a certain configurative element from other configurative elements. For example, a first configurative element may be named a second configurative element and still be within the scope of right of the present disclosure. Likewise, a second configurative element may be named a first configurative element in the same manner. The terminology "and/or" is used to comprise a combination of a plurality of related matters or to comprise any one of the plurality of related matters.

When mentioned that a configurative element is "connected" or "accessed" to another configurative element, the configurative element may be directly connected or accessed to the another configurative element, but it should be appreciated that there may be yet another configurative element therebetween. On the other hand, when mentioned that a configurative element is "directly connected" or "directly accessed" to another configurative element, it should be appreciated that there is no configurative element therebetween.

The terminologies in the present application were used for the sole purpose of explaining certain exemplary embodiments, and not for the purpose of limiting the present disclosure. Singular expressions comprise plural expressions unless clearly stated otherwise in the context. In the present application, it should be appreciated that terminologies such as "comprise" or "has/have" are used for the purpose of defining that the features, numbers, steps, operations, configurative elements, components or combinations thereof mentioned in the specification exist, and not for the purpose of excluding the existence of one or more other features, numbers, steps, operations, configurative elements, components, or combinations thereof or the possibility of adding one of more other features, numbers, steps, operations, configurative elements, components, or combinations thereof.

Preferable exemplary embodiments of the present disclosure will be explained in more detail below with reference to the attached drawings. The same reference numerals were used for the same configurative elements in the drawings, and explanation on the same configurative elements are omitted.

Electrostatic capacitive type TSPs may be classified into those using one indium tin oxide (ITO, $In_2O_3$—$SnO_2$) electrode and the others using two or more indium tin oxide (ITO, $In_2O_3$—$SnO_2$) electrodes. Meanwhile, in order to strengthen the durability of a TSP and simplify the process of manufacturing such a TSP, strengthened glass or strengthened plastic (PMMA) may be used for the window of the electrostatic capacitive type TSP. The one-layer or two-layer pattern structure of electrostatic capacitive type TSPs may be classified according to patterning type and sensing type.

In order to realize the multi-touch function in an electrostatic capacitive TSP, either one or two electrodes may be used. When one electrode is used, the TSP will be realized in a matrix-switching method, and when two electrodes are used, the TSP will be realized in a mutual method.

In electrostatic capacitive type TSPs, it is general to measure changes in mutual capacitance with two electrodes, and the lower the surface resistance of the transparent electrodes used, the bigger size TSPs can be manufactured.

For example, supposing the surface resistance required in a 10-inch size electrostatic capacitive type TSP is 150 Ω/sqm, in order to feel the same touch speed and sensitivity in a 30-inch size TSP, that is 9 times the size of the 10-inch size electrostatic capacitive type TSP, the required surface resistance would be 20~30 Ω/sqm, which is approximately 1/9 times the surface resistance of the 10-inch size TSP. Thus, in a 10-inch size TSP, an ITO electrode of related art would be sufficient, but in a TSP of a size of 30-inches or more, it would be difficult to secure a low surface resistance with an ITO electrode of related art.

As an alternative to the ITO transparent electrode, a hybrid transparent electrode made of oxide/metal/oxide (OMO) layer may provide a transmittance of 90% or more (base: air) and a very low surface resistance of not more than 10 Ω/sqm, and may thus be suitable in manufacturing electrostatic capacitive type large size TSPs.

A method for manufacturing a touch sensor integrated on a strengthened substrate (strengthened glass, plastic) according to exemplary embodiments of the present disclosure will be explained hereinbelow. According to exemplary embodiments of the present disclosure, an electrostatic capacitive type touch screen panel may be realized. Furthermore, a large size electrostatic capacitive TSP having a pattern of OMO hybrid electrode may be manufactured in replacement of the ITO transparent electrode of related art.

The most important thing in manufacturing a large size TSP having an OMO hybrid electrode is to secure index matching conditions optically. The difference of transmission index or refractive index between an etched electrode and the remaining electrode must be not more than 1% for the pattern to be invisible to human eyes.

When an OMO electrode structure is etched in a large size TSP, it may be difficult to obtain an optically excellent index-matching. That is because, in most of the OMO combinations, the difference of transmission index or refractive index between an etched electrode and the remaining electrode is about 3~4%.

As such, in order to obtain optical index-matching which is a problem in the case of applying a large size TSP utilizing an OMO hybrid electrode in a touch screen panel according to exemplary embodiments of the present disclosure, an inter-layer (IL) is inserted between etched OMO patterns, thereby securing index-matching conditions.

According to the exemplary embodiments of the present disclosure, it is possible to realize a high transmission and low resistance TSP pattern using an OMO hybrid electrode (or hybrid transparent electrode) made of oxide/metal/oxide (OMO) layer instead of an ITO transparent electrode that used to be used in electrostatic capacitive type TSPs of related art. By this method, a mutual type TSP which has its basis on a two-layer electrode may be realized as a large size TSP of 30~100 inches or more whereby the optical pattern index-matching problem may be resolved. Furthermore, a matrix-switching type TSP which has its basis on a one-layer electrode structure may be realized as a TSP of not more than 20 inches capable of performing the multi-touch function.

FIG. 1 is a conceptual diagram of a matrix-switching pattern TSP according to an exemplary embodiment of the present disclosure.

FIG. 1 illustrates a TSP of one-layer matrix-switching pattern for resolving the optical index-matching problem.

Referring to FIG. 1, a one-layer matrix-switching pattern TSP may consist of a hybrid transparent electrode 100 and an etched portion of the hybrid transparent electrode 110.

Figure 2:
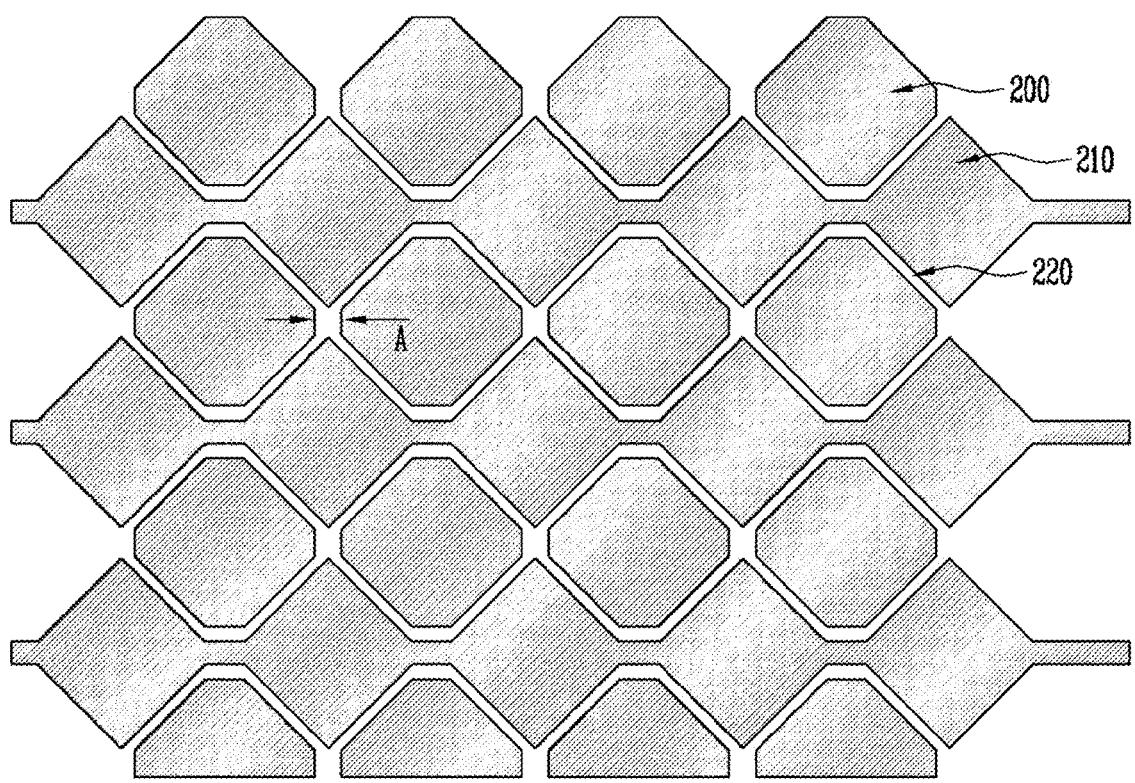
FIG. 2 is a conceptual diagram of a mutual type TSP according to exemplary embodiment of the present disclosure.

FIG. 2 is a conceptual diagram of a mutual type TSP according to an exemplary embodiment of the present disclosure.

FIG. 2 illustrates a two-layer mutual type TSP for resolving the optical index-matching problem. A two-layer mutual type TSP may be realized using a bridge electrode on diamond shape pattern.

Referring to FIG. 2, a two-layer mutual type TSP may consist of a Y-axis direction hybrid transparent electrode 200, X-axis hybrid transparent electrode 210 and etched hybrid transparent electrode.

To manufacture a TSP as those illustrated in FIG. 1 and FIG. 2, a hybrid transparent electrode (OMO) consisting of a top-layer/metal/bottom-layer (TL/M/BL) may be used. The hybrid transparent electrode according to exemplary embodiments of the present disclosure may be realized by forming a bottom-layer on a strengthened substrate (for example, glass, PMMA, PC, PET) and depositing a metal-layer and top-layer thereon.

The pattern of an electrostatic capacitive type TSP 220 which uses a hybrid transparent electrode may be formed by etching a top-layer/metal/bottom-layer (TL/M/BL) at the same time. Then, an integrated TSP structure may be completed, and an OCA (optical clean adhesive) film may be applied thereto to bond the TSP structure to a display panel.

Figure 3:
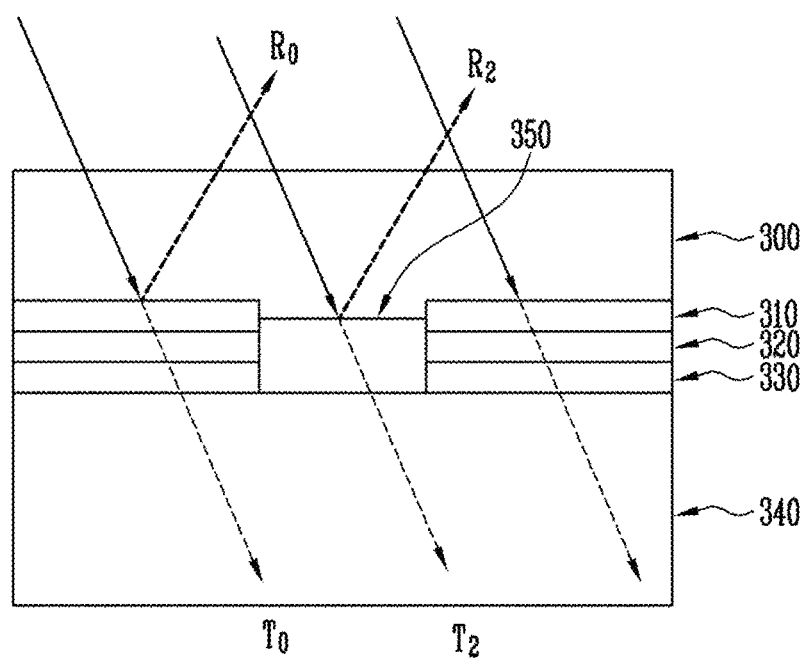
FIG. 3 is a conceptual diagram of a method for forming a pattern in a touch screen panel according to exemplary embodiments of the present disclosure.

FIG. 3 is a conceptual diagram of a method for forming a pattern in a touch screen panel according to an exemplary embodiment of the present disclosure.

Referring to FIG. 3, on an electrostatic capacitive type TSP 300, a bottom-layer 330, metal-layer 320, and top-layer 310 may be deposited successively. The pattern of the touch screen panel may be formed by depositing a bottom-layer 330, metal-layer 320, and top-layer 310, and then etching the same at the same time.

According to exemplary embodiments of the present disclosure, it is possible to form a pattern insertion layer 350 for optical index matching in the pattern formed by etching. The pattern insertion layer 350 may be formed based on an inter-layer (IL) oxide. By using the pattern insertion layer 350, it is possible to realize a touch screen panel having an average difference of transmission index or refractive index of within 1%.

More specifically, in an electrostatic capacitive type TSP, the top-layer 310/metal-layer 320/bottom-layer 330 may be etched at the same time to form a pattern, and then an inter-layer (IL) oxide may be deposited in the pattern as a pattern insertion layer 350.

In an electrostatic capacitive type TSP according to exemplary embodiments of the present disclosure, the hybrid electrode (top-layer 310/metal layer 320/bottom-layer 330) and pattern insertion layer 350 may have the following conditions.

The top-layer 310 having a thickness of 30~70 nm of oxide (that includes TCO (transparent conducting oxide)) with a refractive index of 1.8~2.2 may be deposited on top of the metal-layer 320. In the top-layer 310, ITO, indium-zinc oxide (IZO), Al-doped ZnO (AZO), Ga-doped ZnO (GZO), indium-tin-zinc oxide (ITZO), zinc-tin oxide (ZTO), indium-gallium oxide (IGO), SnO2, and ZnO and the like may be used as an oxide.

The metal-layer 320 may be formed by Ag or Ag alloy of a very thin thickness of 5~10 nm. Ag alloy may consist of binary alloys such as Ag—Al, Ag—Mo, Ag—Au, Ag—Pd, Ag—Ti, and Ag—Cu, or ternary alloys such as Ag—Au—Pd and Ag—Au—Cu.

The bottom-layer 330 may consist of oxide having a refractive index of 2.0~2.7, and may be deposited on top of the strengthened substrate 340 such that it has a thickness of 20~60 nm.

Oxides for the bottom-layer 330 may be those having high refractive index that may be deposited on top of the strengthened substrate (for example, strengthened glass, hard plastic, 340).

The pattern insertion layer 350 may consist of an oxide having a refractive index of 1.6~2.0, and may be formed such that it has a thickness of 60~120 nm. The pattern insertion layer 350 may be realized based on an oxide having a relatively low refractive index such as MgO, $Ta_2O_3$, and SiON and the like.

Figure 4:
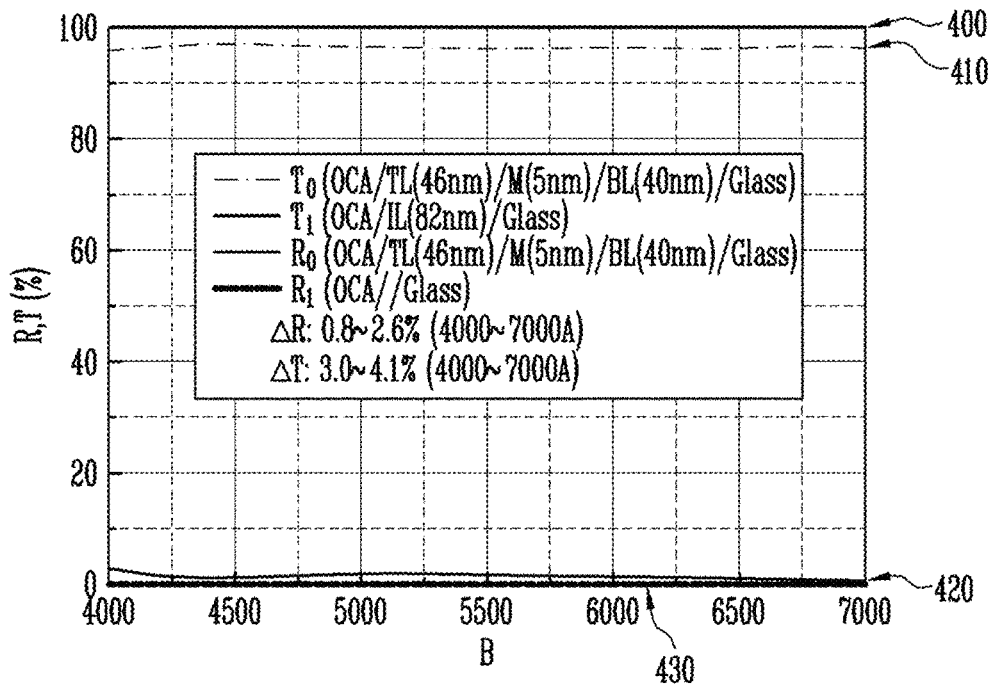
FIG. 4 is a graph of optical characteristics in the case of applying a TSP manufacturing method of related art.

FIG. 4 is a graph showing optical characteristics when a TSP manufacturing method of related art is applied.

Referring to FIG. 4, the difference of refractive index between the etched portion of the transparent electrode and the remaining portion is $\Delta R=R1(430)-R0(420)=0.8~2.6\%$, and the difference of transmission index between the etched portion of the transparent electrode and the remaining portion has quite a big value of $\Delta T=T1(410)-T0(400)=3.0~4.1\%$.

When the differences of refractive index and of transmission index between the etched portion and the remaining portion of the transparent electrode are as above, human eyes would recognize the pattern of the OMO electrode. However, it is possible to resolve such an optical index-matching problem by the method for forming a pattern in a touch screen panel according to exemplary embodiments of the present disclosure.

Figure 5:
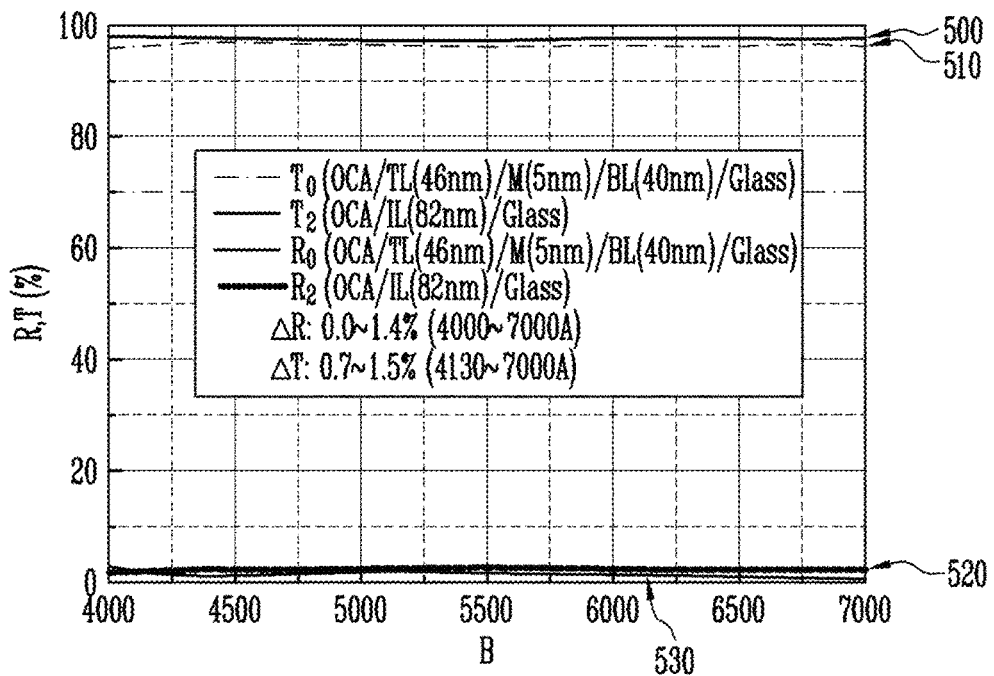
FIG. 5 is a conceptual diagram of a method for forming a pattern in a touch screen panel according to exemplary embodiments of the present disclosure.

FIG. 5 is a conceptual diagram of a method for forming a pattern in a touch screen panel according to an exemplary embodiment of the present disclosure.

In the etched portion of the hybrid transparent electrode, a pattern insertion layer may be formed for optical index-matching.

Referring to FIG. 5, it can be seen that when using such a method, the differences of refractive index and transmission index between the etched transparent electrode and the remaining portion are quite low, that is, $\Delta R=R2(500)-R0(510)=0.0~1.4\%$, and $\Delta T=T2(520)-T0(530)=0.7~1.5\%$, respectively.

As aforementioned, since it is possible to adjust the difference of refractive index and transmission index to be within an average of 1%, the pattern becomes not easily recognizable by human eyes, thereby resolving the optical index-matching problem of a touch screen that uses the OMO electrode patterning method of related art.

Figure 6:
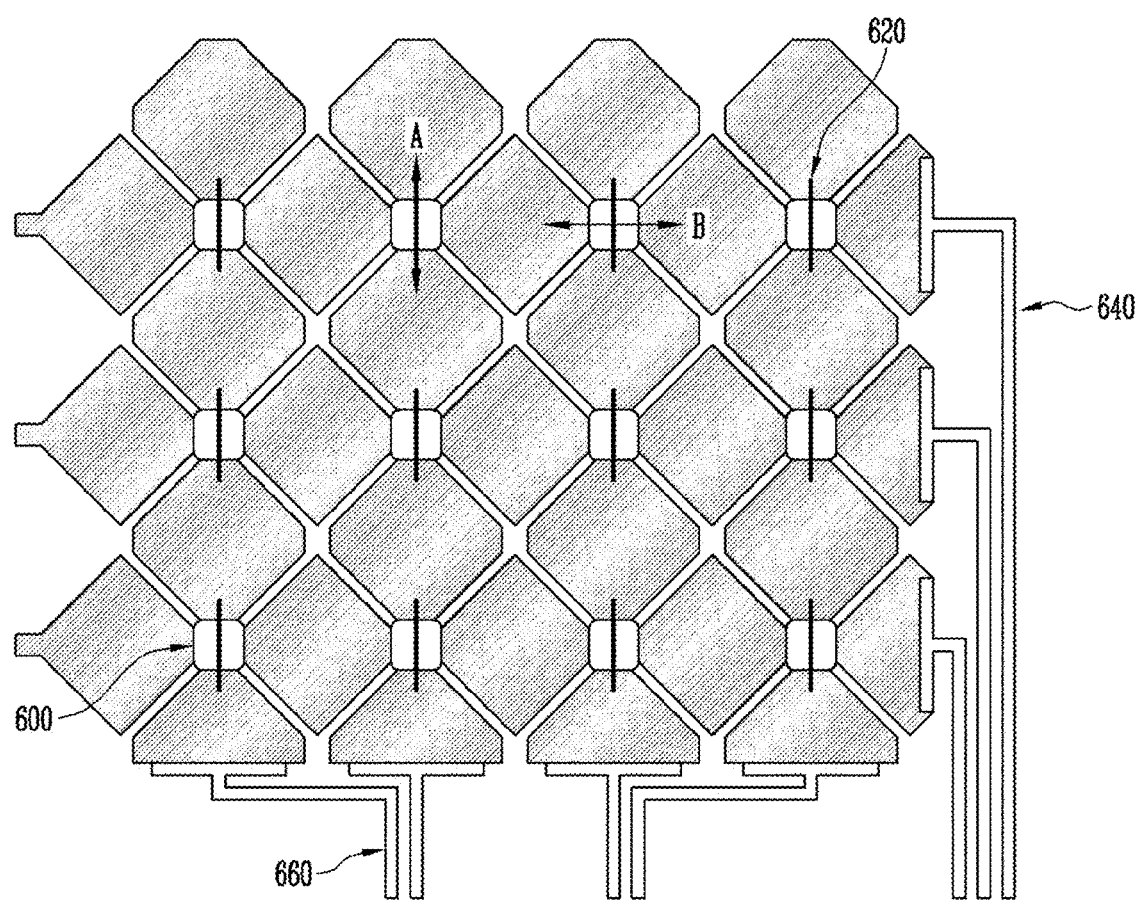
FIG. 6 is a configuration diagram of an electrostatic capacitive touch screen panel (TSP) according to exemplary embodiments of the present disclosure.

FIG. 6 is a configuration diagram of an electrostatic capacitive touch panel (TSP) according to an exemplary embodiment of the present disclosure.

Referring to FIG. 6, an electrostatic capacitive type touch screen panel according to exemplary embodiments of the present disclosure may consist of an X axis and Y axis. An electrostatic capacitive type touch screen may comprise a patterned Y axis electrode and patterned X axis electrode.

An insulation layer 600 of FIG. 6 may be made of SiOx, SiNx, MgF2, SiOxNy, and organic insulation layer. The bridge electrode 620 may consist of a metal or transparent electrode. When the bridge electrode 620 is a metal electrode, it may have a width of 2-20 um that is not recognizable by human eyes. The bridge electrode 620 and metal wire 640, 660 may be realized to have the same thickness. The bridge electrode 620 and/or metal wire 640, 660 may be realized as a single layer or multi-layer metal made of Mo, Al, Cu, Cr, Ag, Ti/Cu, Ti/Ag, Cr/Ag, Cr/Cu, Al/Cu, and Mo/Al/Mo and the like.

In FIG. 6, when a transparent electrode TCO is used for the bridge electrode 620, materials such as ITO, IZO, and IZTO may be applied.

Figure 7:
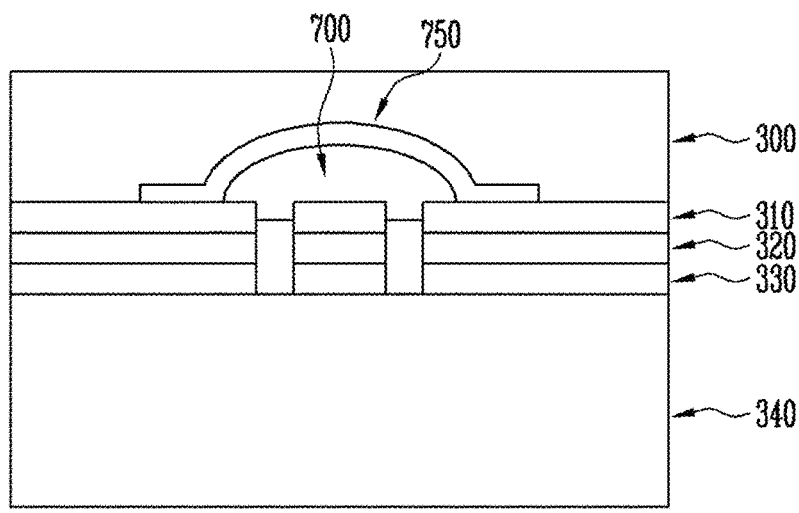
FIGS. 7 and 8 are conceptual diagrams of an electrostatic capacitive touch screen panel (TSP) according to exemplary embodiments of the present disclosure.
Figure 8:
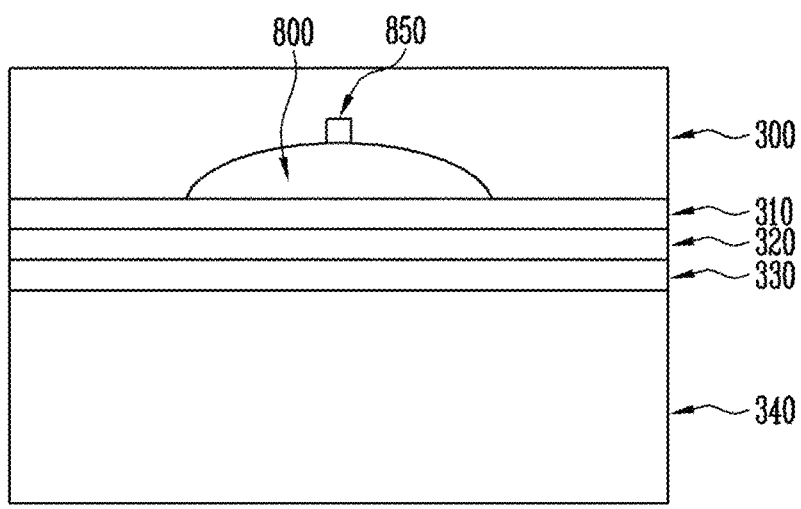

FIGS. 7 and 8 are conceptual diagrams of an electrostatic capacitive type touch screen panel according to an exemplary embodiment of the present disclosure seen from A direction and B direction.

FIGS. 7 and 8 are conceptual diagrams of an electrostatic capacitive type touch screen panel according to an exemplary embodiment of the present disclosure.

FIG. 7 is a cross-sectional view of an electrostatic capacitive type touch screen panel of FIG. 6 seen from A direction.

Referring to FIG. 7, a pattern may be formed by depositing a bottom-layer, metal-layer, and top-layer successively, and then etching the top-layer/metal-layer/bottom-layer at the same time. Furthermore, on the pattern formed by etching the layers, it is possible to form an inter-layer oxide as a pattern insertion layer for optical index-matching.

An insulation layer 700 may be formed on top of the pattern insertion layer and top-layer, and a bridge may be realized on top of the insulation layer 700. It can be seen that the bridge is formed in A direction, and thus the bridge electrode 750 on the insulation layer 700 connects the top end and the bottom end.

FIG. 8 is a cross-sectional view of an electrostatic capacitance type touch screen panel of FIG. 6 seen from B direction.

Likewise, an insulation layer 800 may be formed on top of the pattern insertion layer and top-layer, and a bridge 850 may be realized on top of the insulation layer.

Figure 9:
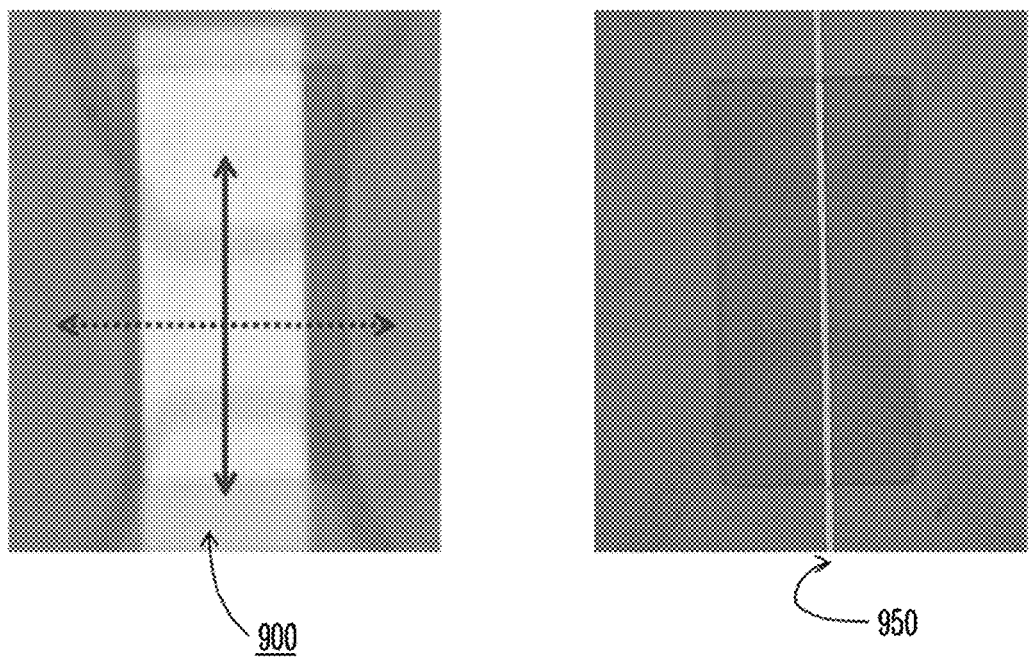
FIG. 9 is a conceptual diagram of an electrostatic capacitive touch screen panel (TSP) according to exemplary embodiments of the present disclosure.

FIG. 9 is a conceptual diagram of an electrostatic capacitive touch screen panel according to an exemplary embodiment of the present disclosure.

The left of FIG. 9 is an exemplary embodiment of a case where the bridge electrode of the aforementioned FIG. 6 is made of ceramic material, more particularly, where ceramic material transparent electrode 900 is applied.

The right of FIG. 9 is an exemplary embodiment of a case where the bridge electrode 950 is made of metal material.

A touch screen panel created in the aforementioned method is provided with a strengthened substrate integrated with a hybrid electrode (for example, OMO (oxide-metal-oxide)) thereby realizing low resistance and high transmission while realizing a large size, multi-touch function, emotional touch function by securing optical index-matching.

In the case of using a hybrid transparent electrode according to an exemplary embodiment of the present disclosure, it is possible to realize the TSP multi-touch function in an area that is 30 times bigger than an electrostatic capacitive touch screen panel (TSP) of related art. Furthermore, in a touch screen panel according to exemplary embodiments of the present disclosure, the pattern index-matching problem which used to be a problem in hybrid electrodes can be resolved, and thus a high-resolution display can be realized. Not only that, when a touch screen panel according to exemplary embodiments of the present disclosure is applied to a one layer TSP, the multi-touch function can be realized in up to 20 inches, and when such a touch screen panel is applied to two layer TSP, the multi-touch function can be realized in up to 100 inches.

Figure 10:
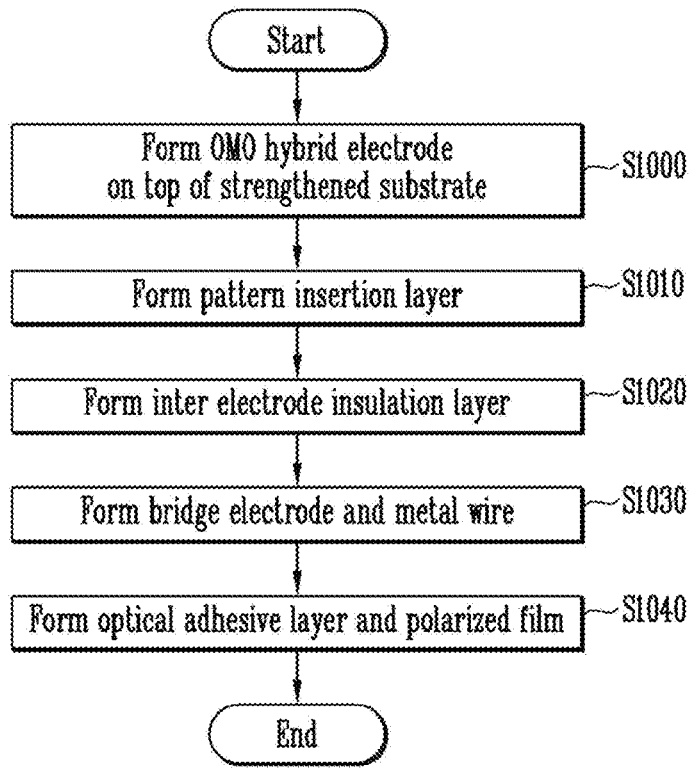
FIG. 10 is a flowchart of a method for creating a touch screen panel (TSP) according to exemplary embodiments of the present disclosure.

FIG. 10 is a flowchart of a method for creating a touch screen panel according an exemplary embodiment of the present disclosure.

Referring to FIG. 10, an OMO hybrid electrode is formed on top of a strengthened substrate (operation S1000).

For example, the strengthened substrate may be a strengthened glass, strengthened PMMA, or a PC or PET coated with a strengthened film. A touch sensor of the strengthened substrate may be realized such that it has a thickness of not more than 3 mm and a transmission index of at least 80%.

An OMO hybrid transparent electrode according to exemplary embodiments of the present disclosure may be realized by a top-layer/metal-layer/bottom-layer and pattern insertion layer. Such an electrode structure may be used in a one-layer structure matrix-switching type TSP and in a two-layer structure mutual type TSP. By using such an OMO hybrid transparent electrode, it is possible to realize a large size TSP that can be multi-touched.

As aforementioned, the top-layer may be formed such that it has a thickness of 30~70 nm made of an oxide (including TCO) having a refractive index of 1.8~2.2. The oxide used to form the top-layer may comprise ITO, indium-zinc oxide (IZO), Al-doped ZnO (AZO), Ga-doped ZnO (GZO), indium-tin-zinc oxide (ITZO), zinc-tin oxide (ZTO), indium-gallium oxide (IGO), $SnO_2$, and ZnO and the like.

The metal-layer may be formed such that it has a very thin thickness of 5~10 nm, and may be made of Ag or Ag alloy. The Ag alloy may consist of binary alloys such as Ag—Al, Ag—Mo, Ag—Au, Ag—Pd, Ag—Ti, and Ag—Cu, or ternary alloys such as Ag—Au—Pd and Ag—Au—Cu.

The bottom-layer may be formed such that it has a refractive index of 2.0~2.7, and a thickness of 20~60 nm. The bottom-layer may be made of an oxide having a high refractive index such as $TiO_2$, $Nb_2O_5$, ZnO, $ZrO_2$, and $HfO_2$.

Next, a pattern insertion layer is formed (operation S1010).

In a touch screen panel according to exemplary embodiments of the present disclosure, a pattern insertion layer may be formed for optimization of index matching. The pattern insertion layer may be formed as an inter-layer such that it has a thickness of 60~120 nm, made of an oxide having a refractive index of 1.6~2.0. The inter-layer may be made of an oxide having a relatively low refractive index such as MgO, $Ta_2O_3$, and SiON and the like.

Next, an insulation layer is formed between electrodes (operation S1020).

In the case of a two-layer structure mutual type TSP, an inter-electrode insulation layer may be formed. The inter-electrode insulation layer may be formed based on inorganic and organic material such as SiOx, SiNx, $MgF_2$, and SiOxNy and the like.

Next, a bridge electrode and metal wire are formed (operation S1030).

In the case of a two-layer structure mutual type TSP, the bridge electrode may be formed. The bridge electrode may be formed such that it has a width of 2~20 um. The bridge electrode and metal wire may be formed at the same time in which case the thickness thereof may be the same. The material of the metal may be a single or multi-layered metal such as Mo, Al, Cu, Cr, Ag, Ti/Cu, Ti/Ag, Cr/Ag, Cr/Cu, Al/Ag, Al/Cu, and Mo/Al/Mo.

Next, an optical adhesive film and polarized film are formed (operation S1040).

Based on the operations S1000 to S1030, the patterned touch screen panel and optically clear adhesive (OCA) film, polarized film and liquid-crystal display (LCD) (or AMO-LED (active-matrix organic light-emitting diode)) may be formed.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A method for manufacturing an electrostatic capacitive type window integrated touch screen panel, the method comprising:
   forming an oxide metal oxide(OMO) hybrid electrode on a strengthened substrate, wherein the OMO hybrid electrode is formed by depositing a bottom-layer, a metal-layer and a top-layer on top of the strengthened substrate;
   etching the bottom-layer, the metal-layer and the top-layer to form a pattern which is an etched portion; and then
   depositing a pattern insertion layer in the etched portion, wherein the pattern insertion layer is formed based on an oxide.

2. The method according to claim 1, further comprising:
   forming an inter electrode insulation layer on top of the top-layer and the pattern insertion layer; and
   forming a bridge on top of the inter electrode insulation layer and connecting a metal wire to the OMO hybrid electrode.

3. The method according to claim 2,
   wherein the inter electrode insulation layer is made of inorganic and organic material,
   the inorganic and the organic material is selected from the group consisting of SiOx, SiNx, $MgF_2$, and SiOxNy, wherein x and y are natural numbers, the bridge and the metal wire are realized at the same time, the bridge and the metal wire are made of metal of a same thickness, and the metal is a single layer and multi metal layer, the metal being selected from the group consisting of Mo, Al, Cu, Cr, Ag, Ti/Cu, Ti/Ag, Cr/Ag, Cr/Cu, Al/Ag, Al/Cu, and Mo/Al/Mo.

4. The method according to claim 2,
wherein the refractive index of the pattern insertion layer is at least 1.6 but not more than 2.0,
the pattern insertion layer has a thickness of at least 60 nm but not more than 120 nm, and
the oxide of the pattern insertion layer is selected from the group consisting of MgO, $Ta_2O_3$ and SiON.

5. The method according to claim 4,
wherein the top-layer has a refractive index of at least 1.8 but not more than 2.2,
the top-layer has a thickness of at least 30 nm but not more than 70 nm, and
the top-layer is made of material selected from the group consisting of indium tin oxide(ITO), indium-zinc oxide (ITO), Al-doped ZnO(AZO), Ga-doped ZnO(GZO), indium-tin-zinc oxide(ITZO), zinc-tin oxide(ZTO), indium-gallium oxide(IGO), $SnO_2$ and ZnO.

6. The method according to claim 5,
wherein the metal-layer has a thickness of at least 5 nm but not more than 10 nm,
the metal-layer is made of Ag or Ag alloy, and
the Ag alloy is selected from the group consisting of Ag—Al, Ag—Mo, Ag—Au, Ag—Pd, Ag—Ti, Ag—Cu, Ag—Au—Pd, and Ag—Au—Cu.

7. The method according to claim 6,
wherein the bottom-layer has a refractive index of at least 2.0 but not more than 2.7,
the bottom-layer has a thickness of at least 20 nm but not more than 60 nm, and
the bottom-layer is at least one selected from the group consisting of $TiO_2$, $Nb_2O_5$, ZnO, $ZrO_2$, and $HfO_2$.

8. The method according to claim 1,
wherein the top-layer has a refractive index of at least 1.8 but not more than 2.2.

9. The method according to claim 1,
wherein the bottom-layer has a refractive index of at least 2.0 but not more than 2.7.

10. An electrostatic capacitive type window integrated touch screen panel, the touch screen panel comprising:
an oxide metal oxide(OMO) hybrid electrode deposited on top of a strengthened substrate, wherein the OMO hybrid electrode is formed by depositing a bottom-layer, a metal-layer and a top-layer on top of the strengthened substrate, and the OMO hybrid electrode includes a pattern which is an etched portion in which the bottom-layer, the metal-layer and the top-layer are etched; and
a pattern insertion layer deposited in the etched portion, wherein the pattern insertion layer is formed on the basis of an oxide.

11. The touch screen panel according to claim 10, further comprising an inter electrode insulation layer formed on top of the top-layer and the pattern insertion layer;
a bridge formed on top of the inter electrode insulation layer; and
a metal wire connected to the OMO hybrid electrode.

12. The touch screen panel according to claim 10,
wherein the inter electrode insulation layer is made of inorganic and organic material, the inorganic and the organic material is selected from the group consisting of SiOx, SiNx, $MgF_2$, and SiOxNy, wherein x and y are natural numbers,
the bridge and the metal wire are realized at the same time,
the bridge and the metal wire are made of metal of a same thickness, and
the metal is a single and multi metal layer, the metal being selected from the group consisting of Mo, Al, Cu, Cr, Ag, Ti/Cu, Ti/Ag, Cr/Ag, Cr/Cu, Al/Ag, Al/Cu, and Mo/Al/Mo.

13. The touch screen panel according to claim 10,
wherein the pattern insertion layer has a refractive index of at least 1.6 but not more than 2.0,
the pattern insertion layer has a thickness of at least 60 nm but not more than 120 nm, and
the oxide of the pattern insertion layer is selected from the group consisting of MgO, $Ta_2O_3$, and SiON.

14. The touch screen panel according to claim 13,
wherein the top-layer has a refractive index of at least 1.8 but not more than 2.2,
the top-layer has a thickness of at least 30 nm but not more than 70 nm, and
the top-layer is made of material selected from the group consisting of indium tin oxide(ITO), indium-zinc oxide (ITO), Al-doped ZnO(AZO), Ga-doped ZnO(GZO), indium-tin-zinc oxide(ITZO), zinc-tin oxide(ZTO), indium-gallium oxide(IGO), $SnO_2$ and ZnO.

15. The touch screen panel according to claim 14,
wherein the metal-layer has a thickness of at least 5 nm but not more than 10 nm,
the metal-layer is made of Ag or Ag alloy, and
the Ag alloy is selected from the group consisting of Ag—Al, Ag—Mo, Ag—Au, Ag—Pd, Ag—Ti, Ag—Cu, Ag—Au—Pd, and Ag—Au—Cu.

16. The touch screen panel according to claim 15,
wherein the bottom-layer has a refractive index of at least 2.0 but not more than 2.7,
the bottom-layer has a thickness of at least 20 nm but not more than 60 nm, and
the bottom-layer is one selected from the group consisting of $TiO_2$, $Nb_2O_5$, ZnO, $ZrO_2$, and $HfO_2$.

17. The method according to claim 8,
wherein the top-layer has a refractive index of at least 1.8 but not more than 2.2.

18. The method according to claim 10, wherein the bottom-layer has a refractive index of at least 2.0 but not more than 2.7.

* * * * *